US012122363B2

(12) United States Patent
Wirthl et al.

(10) Patent No.: US 12,122,363 B2
(45) Date of Patent: Oct. 22, 2024

(54) OVERRUNNABLE SMALL PLATFORM TEST VEHICLE WITH SOFT TARGET MOUNT

(71) Applicant: Humanetics Austria GmbH, Linz (AT)

(72) Inventors: David Wirthl, Linz (AT); Jürgen Gugler, Ulmerfeld (AT)

(73) Assignee: Humanetics Austria GmbH, Linz (AT)

( * ) Notice: Subject to any disclaimer, the term of this patent is extended or adjusted under 35 U.S.C. 154(b) by 389 days.

(21) Appl. No.: 17/549,383

(22) Filed: Dec. 13, 2021

(65) Prior Publication Data

US 2022/0185264 A1 Jun. 16, 2022

Related U.S. Application Data

(60) Provisional application No. 63/125,029, filed on Dec. 14, 2020.

(51) Int. Cl.
*G01M 17/007* (2006.01)
*A63H 17/26* (2006.01)
(Continued)

(52) U.S. Cl.
CPC ............ *B60W 30/08* (2013.01); *B60W 30/10* (2013.01); *G01M 17/007* (2013.01);
(Continued)

(58) Field of Classification Search
CPC ................ B60W 30/08; B60W 30/10; B60W 2420/408; B60W 2554/4049; G01M 17/007; G01M 17/0078; A63H 17/262
See application file for complete search history.

(56) References Cited

U.S. PATENT DOCUMENTS 5,749,633 A 5/1998 Baumgartner
8,428,863 B2 4/2013 Kelly et al.
(Continued)

FOREIGN PATENT DOCUMENTS

CN 107132054 A 9/2017
CN 107300473 A 10/2017
(Continued)

OTHER PUBLICATIONS

US 8,706,395 B2, 04/2014, Kelly et al. (withdrawn)
(Continued)

*Primary Examiner* — Eric S. McCall
*Assistant Examiner* — Timothy P Graves
(74) *Attorney, Agent, or Firm* — Howard & Howard Attorneys PLLC

(57) ABSTRACT

The teaching generally provide for an overrunable test vehicle for dynamic vehicle testing of advanced driver assistant systems. The overrunable test vehicle comprising a chassis with a control section defining a cavity, the control section having a profile height, and a carrier section having a profile height different than the control section profile height, the carrier section including a mounting area configured to receive a soft target. The overrunable test vehicle including a caster member supported by the chassis in the carrier section, a drive mechanism located in the control section having an electric motor and a drive wheel. The overrunable test vehicle also including a control system disposed within the cavity of the control section and coupled with the at least one electric motor for sending and receiving information.

19 Claims, 15 Drawing Sheets

(51) Int. Cl.
*B60W 30/08* (2012.01)
*B60W 30/10* (2006.01)

(52) U.S. Cl.
CPC ..... *A63H 17/262* (2013.01); *B60W 2420/408* (2024.01); *B60W 2554/4049* (2020.02)

(56) References Cited

U.S. PATENT DOCUMENTS

| | | | |
|---|---|---|---|
| 8,428,864 | B2 | 4/2013 | Kelly et al. |
| 8,447,509 | B2 | 5/2013 | Kelly et al. |
| 8,457,877 | B2 | 6/2013 | Kelly et al. |
| 8,583,358 | B2 | 11/2013 | Kelly et al. |
| 8,589,062 | B2 | 11/2013 | Kelly et al. |
| 8,751,143 | B2 | 6/2014 | Kelly et al. |
| 9,182,942 | B2 | 11/2015 | Kelly et al. |
| 9,355,576 | B2 | 5/2016 | Fritz |
| 9,827,998 | B1 | 11/2017 | Kelly |
| 9,870,722 | B2 | 1/2018 | Fritz et al. |
| 10,352,826 | B2 | 7/2019 | Fritz et al. |
| 10,379,007 | B2 | 8/2019 | Perrone et al. |
| 10,718,690 | B2 | 7/2020 | Jeong et al. |
| 10,830,670 | B2 | 11/2020 | Simader et al. |
| 10,955,313 | B2 | 3/2021 | Hafellner et al. |
| 11,092,515 | B2 | 8/2021 | Hafellner et al. |
| 11,125,651 | B2 | 9/2021 | Hafellner et al. |
| 11,187,623 | B2 | 11/2021 | Wimmer et al. |
| 2014/0039727 | A1 | 2/2014 | Kelly et al. |
| 2014/0045631 | A1 | 2/2014 | Kelly et al. |
| 2016/0054199 | A1 | 2/2016 | Fritz et al. |
| 2018/0158375 | A1 | 6/2018 | Fritz et al. |
| 2018/0306676 | A1 | 10/2018 | Wimmer et al. |
| 2018/0313288 | A1 | 11/2018 | Mazenc |
| 2019/0219486 | A1* | 7/2019 | Hafellner ............... C06C 7/00 |
| 2019/0257717 | A1 | 8/2019 | Hafellner et al. |
| 2020/0003658 | A1 | 1/2020 | Hafellner et al. |
| 2021/0046913 | A1 | 2/2021 | Wirthl et al. |
| 2021/0048820 | A1* | 2/2021 | Trazkovich ............ G06N 20/00 |
| 2021/0088417 | A1 | 3/2021 | Gustafsson |
| 2021/0255064 | A1 | 8/2021 | Sones |

FOREIGN PATENT DOCUMENTS

| | | |
|---|---|---|
| CN | 206856427 U | 1/2018 |
| CN | 207215465 U | 4/2018 |
| CN | 207263441 U | 4/2018 |
| CN | 207263442 U | 4/2018 |
| CN | 107972735 A | 5/2018 |
| CN | 108139297 A | 6/2018 |
| CN | 108344586 A | 7/2018 |
| CN | 207730458 U | 8/2018 |
| CN | 207931806 U | 10/2018 |
| CN | 112161816 A | 1/2021 |
| CN | 213580099 U | 6/2021 |
| DE | 102007035474 B4 | 6/2009 |
| DE | 102012207567 B4 | 2/2015 |
| DE | 102016112341 A1 * | 1/2018 |
| DE | 102016112422 A1 | 1/2018 |
| DE | 102016112427 A1 | 1/2018 |
| DE | 102016112518 A1 | 1/2018 |
| DE | 102013214936 B4 | 5/2018 |
| DE | 102015117358 B4 | 12/2018 |
| EP | 2657672 A1 | 10/2013 |
| EP | 2660928 A1 | 11/2013 |
| EP | 2845777 A1 | 3/2015 |
| EP | 2976616 A2 | 1/2016 |
| EP | 2988369 A1 | 2/2016 |
| EP | 2192567 B1 | 8/2016 |
| EP | 3242120 A1 | 11/2017 |
| EP | 2709739 B1 | 7/2018 |
| EP | 3362772 B1 | 12/2020 |
| GB | 2496442 A | 5/2013 |
| KR | 101978817 B1 | 5/2019 |
| KR | 101991044 B1 | 6/2019 |
| WO | 2017064093 A9 | 6/2017 |
| WO | 2018007455 A1 | 1/2018 |
| WO | 2018007458 A2 | 1/2018 |
| WO | 2018007459 A1 | 1/2018 |
| WO | 2020245112 A1 | 12/2020 |
| WO | 2020245298 A1 | 12/2020 |
| WO | 2020254010 A1 | 12/2020 |
| WO | 2020254308 A1 | 12/2020 |

OTHER PUBLICATIONS

ABDynamics ADAS test and validation (Year: 2019).*
4Activessystems GmbH, "Brochure", 2021, 19 pages.
AB Dynamics, "LaunchPad Overview and Features", Nov. 11, 2019, 2 pages.
Computer-generated English language abstract for EP 3 242 120 A1 extracted from espacenet.com database on Feb. 11, 2021, 2 pages.
Dehghani, Dana, "Optimal Anti-lock Braking System With Regenerative Braking in Hybrid Electric Vehicle", HEV ABS, University of Malaysia, Jun. 2014, 30 pages.
English language abstract for CN 107132054 A extracted from espacenet.com database on Dec. 15, 2021, 1 page.
English language abstract for CN 107300473 A extracted from espacenet.com database on Feb. 11, 2021, 1 page.
English language abstract for CN 107972735 A extracted from espacenet.com database on Dec. 15, 2021, 1 page.
English language abstract for CN 108139297 A extracted from espacenet.com database on Jan. 6, 2022, 2 pages.
English language abstract for CN 108344586 A extracted from espacenet.com database on Sep. 21, 2020, 1 page.
English language abstract for CN 112161816 A extracted from espacenet.com database on Dec. 15, 2021, 1 page.
English language abstract for CN 206856427 U extracted from espacenet.com database on Dec. 15, 2021, 1 page.
English language abstract for CN 207215465 U extracted from espacenet.com database on Dec. 15, 2021, 1 page.
English language abstract for CN 207263441 U extracted from espacenet.com database on Dec. 15, 2021, 1 page.
English language abstract for CN 207263442 U extracted from espacenet.com database on Dec. 15, 2021, 1 page.
English language abstract for CN 207730458 U extracted from espacenet.com database on Dec. 15, 2021, 1 page.
English language abstract for CN 207931806 U extracted from espacenet.com database on Dec. 15, 2021, 1 page.
English language abstract for CN 213580099 U extracted from espacenet.com database on Dec. 15, 2021, 1 page.
English language abstract for DE 10 2016 112 422 A1 extracted from espacenet.com database on Dec. 15, 2021, 1 page.
English language abstract for EP 2 192 567 B1 extracted from espacenet.com database on Jan. 6, 2022, 1 page.
English language abstract for EP 2 709 739 B1 extracted from espacenet.com database on Jan. 6, 2022, 1 page.
English language abstract for KR 101978817 B1 extracted from espacenet.com database on Sep. 21, 2020, 2 pages.
English language abstract for KR 101991044 B1 extracted from espacenet.com database on Dec. 15, 2021, 1 page.
English language abstract for WO 2017/064093 A9 extracted from espacenet.com database on Jan. 6, 2022, 2 pages.
English language abstract for WO 2018/007455 A1 extracted from espacenet.com database on Jan. 6, 2022, 1 page.
English language abstract for WO 2018/007458 A1 extracted from espacenet.com database on Jan. 6, 2022, 1 page.
English language abstract for WO 2018/007459 A1 extracted from espacenet.com database on Jan. 6, 2022, 1 page.
English language abstract for WO 2020/245112 A1 extracted from espacenet.com database on Dec. 15, 2021, 1 page.
English language abstract for WO 2020/245298 A1 extracted from espacenet.com database on Dec. 15, 2021, 1 page.
English language abstract for WO 2020/254010 A1 extracted from espacenet.com database on Dec. 15, 2021, 1 page.
English language abstract for WO 2020/254308 A1 extracted from espacenet.com database on Dec. 15, 2021, 1 page.
Euroncap, "European New Car Assessment Programme—Test Protocol—AEB VRU Systems", Version 2.0.3, Nov. 2018, 44 pages.

(56) References Cited

OTHER PUBLICATIONS

European Automobile Manufacturers Association, "Articulated Pedestrian Target Specifications", Version 1.0, 2016, 23 pages.
European Automobile Manufacturers Association, "Bicyclist Target ACEA Specifications", Version 1.0, Nov. 2018, 29 pages.
European Search Report for Application No. EP 20 19 1107 dated Jan. 12, 2021, 2 pages.
ISO, "ISO 19206-2 Manuscript for Publication—Active Safety Test Equipment", 2018, 39 pages.
ISO, "ISO Cd 19206-R Requirements for Bicyclist Targets (CD Ballot Version SC 33 N 119)", 2018, 45 pages.
Machine-assisted English language abstract for DE 10 2012 207 567 B4 extracted from espacenet.com database on Jan. 6, 2022, 3 pages.
Machine-assisted English language abstract for DE 10 2013 214 936 B2 extracted from espacenet.com database on Jan. 6, 2022, 3 pages.
Machine-assisted English language abstract for DE 10 2015 117 358 B4 extracted from espacenet.com database on Jan. 6, 2022, 3 pages.
Machine-assisted English language abstract for DE 10 2016 112 427 A1 extracted from espacenet.com database on Jan. 6, 2022, 2 pages.
Machine-assisted English language abstract for DE 10 2016 112 518 A1 extracted from espacenet.com database on Jan. 6, 2022, 2 pages.
Machine-assisted English language abstract for EP 2 976 616 A2 extracted from espacenet.com database on Jan. 6, 2022, 3 pages.
Machine-assisted English language abstract for EP 3 362 772 B1 extracted from espacenet.com database on Jan. 6, 2022, 3 pages.
Transport Policy, "EU Vehicle Definitions", https://www.transportpolicy.net/standard/eu-vehicle-definitions/, 2018, 7 pages.

* cited by examiner

OVERRUNNABLE SMALL PLATFORM TEST VEHICLE WITH SOFT TARGET MOUNT

CROSS REFERENCE TO RELATED APPLICATION

The subject patent application claims priority to and all the benefits of U.S. Provisional Patent Application No. 63/125,029, filed on Dec. 14, 2020, the entire contents of which are incorporated by reference herein.

TECHNICAL FIELD

This Application generally relates to test vehicles used in relation to Advanced Crash Avoidance, particularly overrunable test vehicles (OTV).

BACKGROUND

With the rise of Advanced Driver Assistant Systems (ADAS) being developed and tested, the need for testing equipment which reduce risk to testing members, while being able to sustain potentially damaging impacts and scenarios has drastically increased. A paramount tool in testing the developing crash avoidance technologies is the use of mobile and controllable platforms. The mobile platforms are adapted to hold a simulated target objects such as an automobile, truck, pedestrian, bicycle, or similar. The simulated target is typically made of a material which will not damage the vehicle equipped with the ADAS, such as foam, cardboard, or any other soft material.

During testing, different soft targets may be employed in different scenarios to obtain different data from the ADAS systems. Depending on the soft target, different mobile test platforms may be used in order to better simulate the particular test scenario to test certain features of the crash avoidance technologies integrated into passenger vehicles.

In some instances, such as shown in FIGS. 1 and 2, show examples of prior art OTVs. FIG. 1 shows one example of a large OTV 10 configured to carry a soft target 92 representing a vehicle. FIG. 2 shows a large OTV 10 with a pedestrian soft target 92. The OTV 10 depicted in FIGS. 1 and 2 are typically used for full-size soft targets 92, such as a car or truck. Although a soft-target shaped as a pedestrian may be placed on the large OTV, as shown in FIG. 2, the larger profile and radar cross section is registered by the ADAS sensors of the vehicle being tested.

It may be attractive to have a small platform test vehicle. It may be attractive to have a test vehicle with a low profile shape. It may be attractive to have a test vehicle with a minimal radar cross section. It may be attractive to have a small footprint OTV for use in testing soft targets configured as pedestrians, particularly in urban environment tests. It may be attractive to have multiple OTVs configured for use together for simulating a busy pedestrian intersection. It may be attractive to have multiple OTVs simulate multiple pedestrian targets moving in close proximity.

SUMMARY

The teaching generally provide for an overrunable test vehicle for dynamic vehicle testing of advanced driver assistant systems. The overrunable test vehicle comprising a chassis with a control section defining a cavity, the control section having a profile height, and a carrier section having a profile height different than the control section profile height, the carrier section including a mounting area configured to receive a soft target. The overrunable test vehicle including a caster member supported by the chassis in the carrier section, a drive mechanism located in the control section having an electric motor and a drive wheel. The overrunable test vehicle also including a control system disposed within the cavity of the control section and coupled with the at least one electric motor for sending and receiving information.

The present teachings also provide for a system adapted to test crash avoidance technologies in a subject vehicle. The system comprises a plurality of overrunnable test vehicles (OTV) adapted to travel across the ground and into the path of a subject vehicle, each of the plurality of OTVs having a chassis, a drive mechanism, a plurality of wheels, and a controller. Each of the chassis including a control section with a profile height, the control section housing the controller, a carrier section with a profile height, the carrier section including a mounting area, at least one soft target removably mounted to each of the carrier sections of the OTVs, and a remote control system in wireless communication with the controllers of the OTVs. The remote control system is configured to control the plurality of OTVs to simulate a cross walk, moving at least one of the plurality of OTVs in a first direction, and at least another of the plurality of OTVs in a second direction.

The present teachings provide for a small platform test vehicle with a low profile. The present teaching provide for a small platform OTV with a minimal radar cross section. The present teachings provide for an OTV configured to be used with multiple OTVs to simulate a busy street or crosswalk, with each OTV capable of traveling at different speeds, different directions, or both.

DETAILED DESCRIPTION

Figure 1:
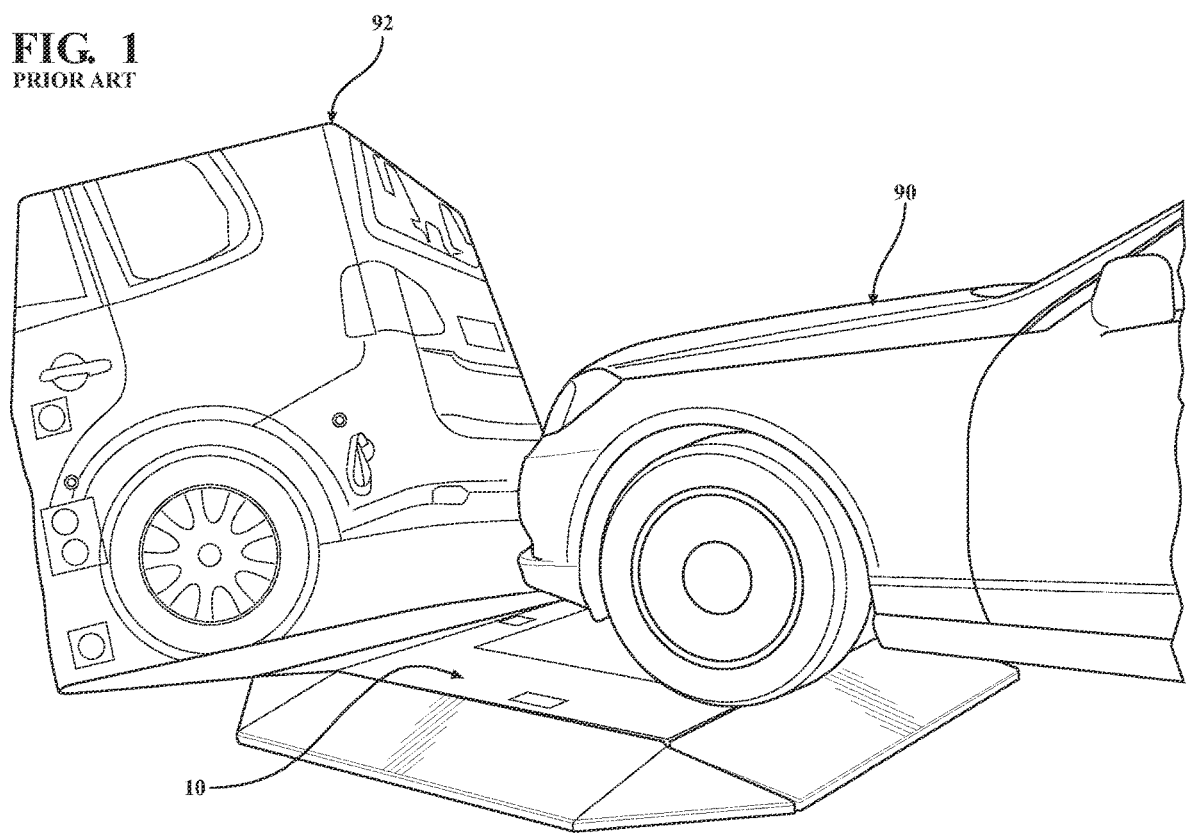
FIG. 1 is a perspective view of a prior art overrunable test vehicle with a soft target being struck by a vehicle.
Figure 2:
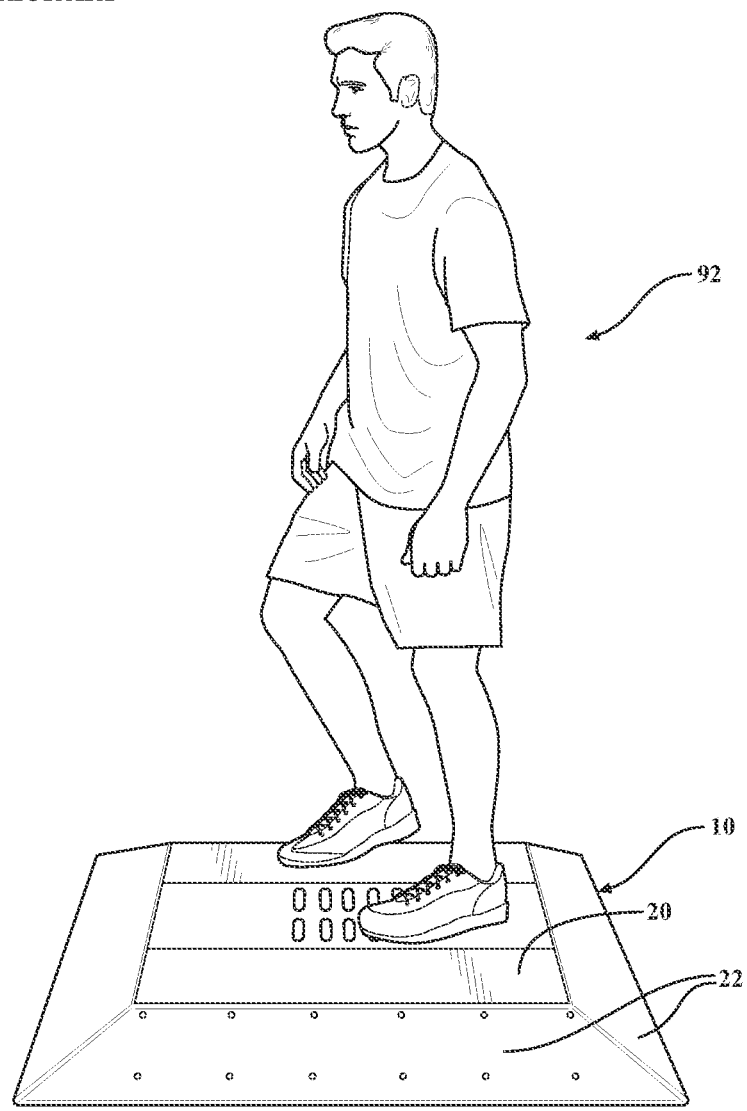
FIG. 2 is a perspective view of a prior art test vehicle and soft target.
Figure 3:
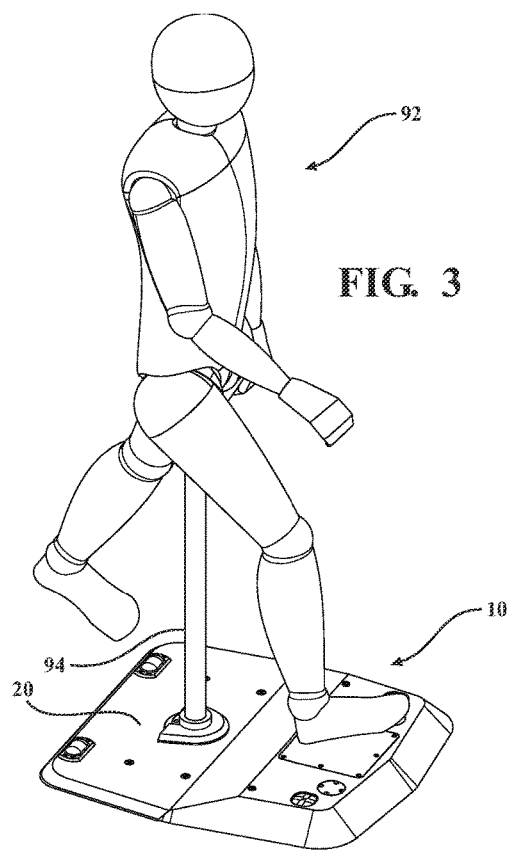
FIG. 3 illustrates a perspective view of a test vehicle consistent with the teachings herewith.
Figure 4:
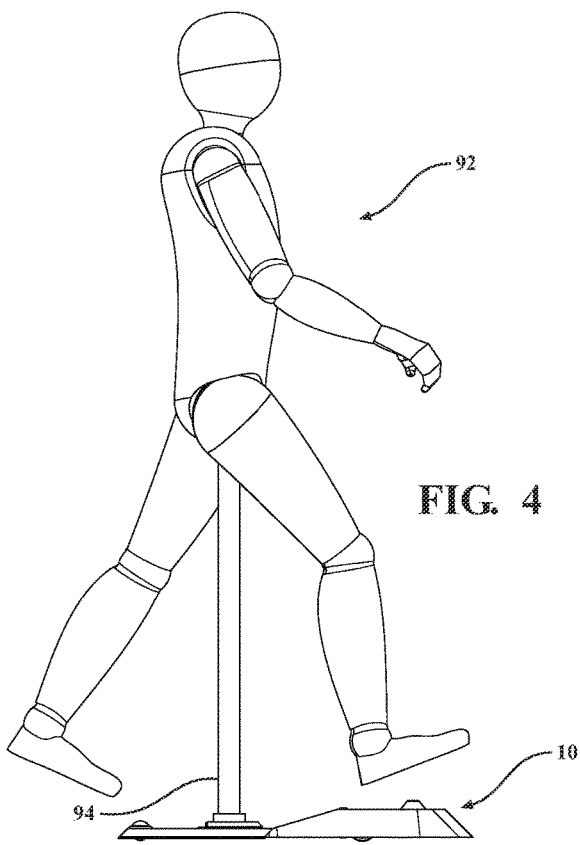
FIG. 4 illustrates a side view of a test vehicle consistent with the teachings herewith.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a test vehicle used in advanced crash avoidance technologies. The test vehicle 10 may function as a mobile and controllable platform for holding a simulated target object 92 such as an automobile, truck, pedestrian, bicycle, or similar. The test vehicle may be an overrunable test vehicle (herein OTV). During crash avoidance testing, the OTV may be subjected to rigorous conditions, including be run over by a vehicle 90 with advanced crash avoidance technologies. The OTV 10 may be configured to withstand the weight of an automobile. For example, the OTV may be able to withstand a passenger car of 3.5 tons. In some examples, the OTV may be able to withstand 4 tons per wheel. The OTV may be configure to hold an automobile consistent with category M1 of the EU vehicle definitions (https://www.transportpolicy.net/standard/eu-vehicle-definitions/). The OTV 10 may be configured to move a soft target with a weight of 5 kilograms (kg) or more, 10 kg or more, 20 kg or more, 50 kg or more, or even 75 kg or more. The OTV 10 may be able to move the one or more soft targets to a speed of at least 5 kilometers per hour (kph), at least 10 kph, or even at least 20 kph. In some examples, the OTV 10 may have a different top speed loaded than when the OTV 10 is free from a soft target. In some examples, the OTV may have a top speed of between 5 kph and 20 kph when loaded with a soft target weighing between 10 kg and 50 kg or more.

The OTV 10 includes a frame 12. The frame 12 (also referred to as chassis) may function as the base structure of the test vehicle. The frame may be made of steel, composite material, aluminum, plastic, or a combination thereof. In some examples, the frame may be a unitary component. In other examples, the frame may be made of two or more modular components. For example and described further below, the control section 14 of the chassis 12 may be made from a single block of machined aluminum and connected with the carrier section 16. The frame 12 may be divided into several sections corresponding with certain features of the OTV. The sections of the frame/chassis 12 may be divided into separate compartments to house the different systems and components of the OTV 10. The chassis 12 of the OTV 10 may have a small footprint designed to carry a pedestrian soft target. The chassis 12 may have a generally geometric shape. For example, the chassis 12 may have a diamond design. Other shapes, such as rectangular, square, circular, triangular, polygonal or the like are contemplated. The chassis 12 may have an overall length of 2000 mm or less. In some examples, the frame has an overall length of 1000 mm or less, or even 800 mm or less. The OTV 10 may have a varying thickness (described further below) ranging between 10 mm and 200 mm. In some examples, the thickness may be between 25 mm and 75 mm. As provided for below, the frame 12 of the OTV may be divided into two or more sections with each section having a different thickness.

Figure 5A:
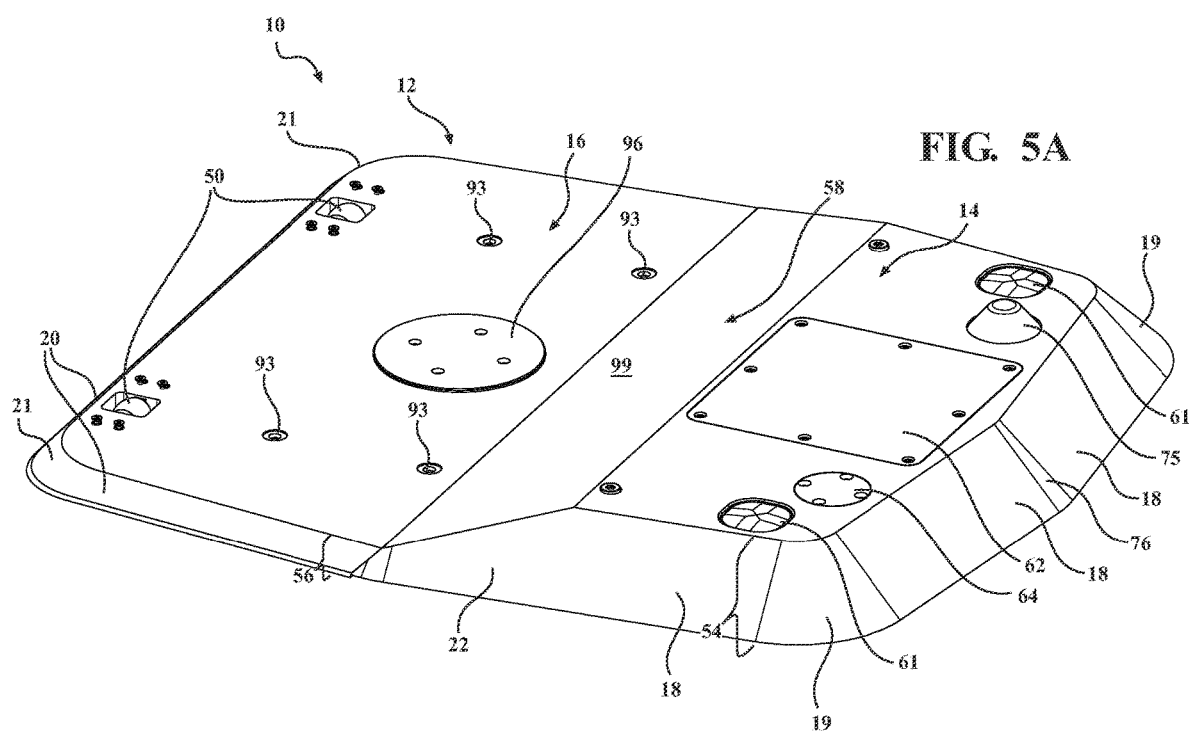
FIG. 5A is a perspective view of a test vehicle.
Figure 5B:
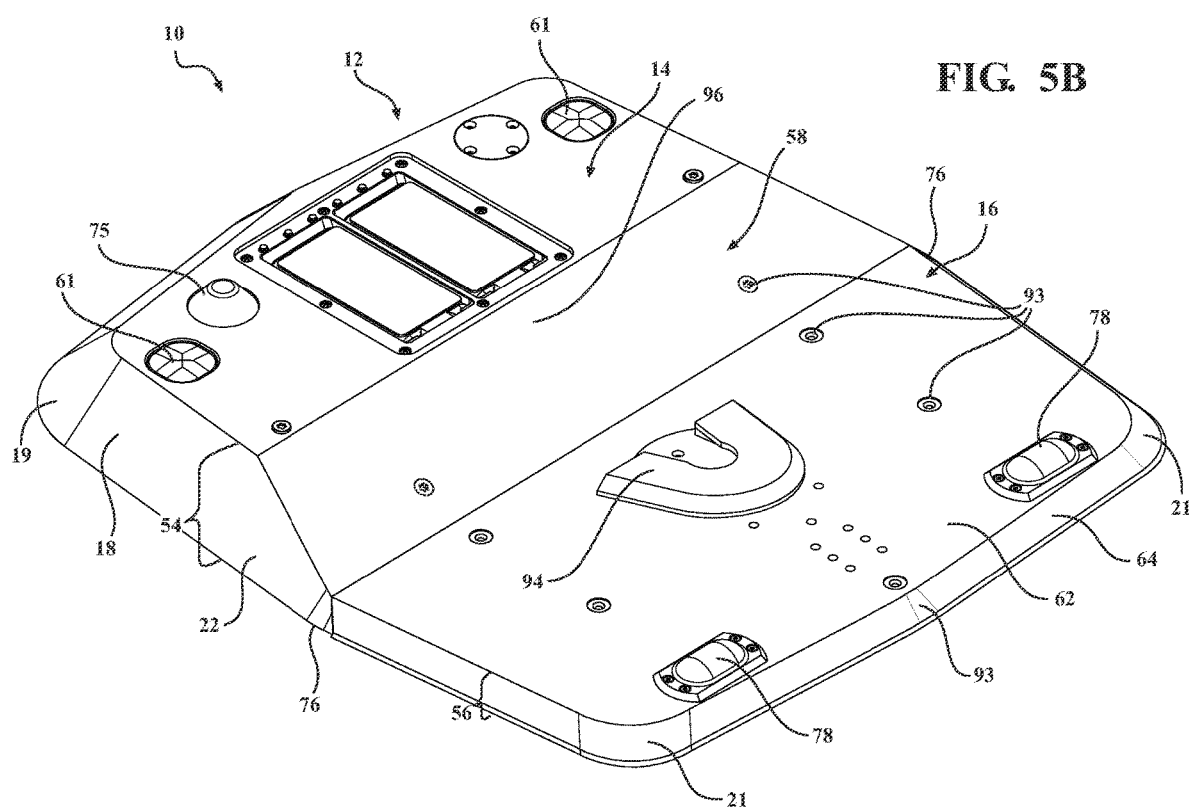
FIG. 5B is a perspective view of a test vehicle.
Figure 5C:
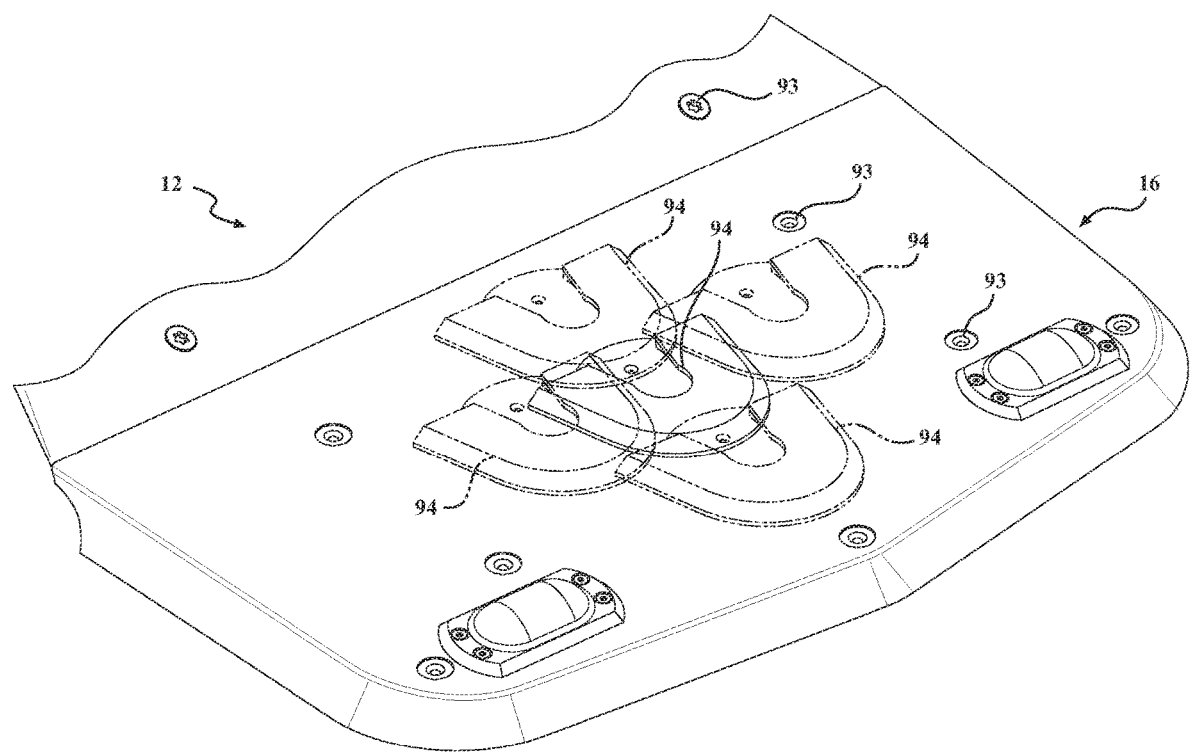
FIG. 5C is a perspective view of the carrier section of a test vehicle with a plurality of example mounting locations for a soft target.
Figure 6:
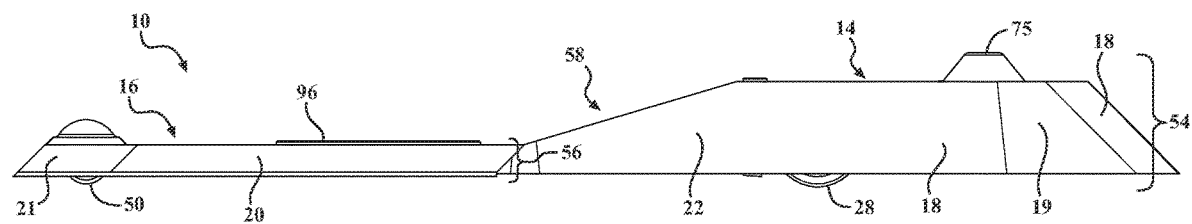
FIG. 6 is a side profile view of a test vehicle.

The frame 12 of the OTV 10 includes one or more sections. The sections 14, 16, 58 may function to separate structural elements, mechanical systems, electrical systems, power systems, sensors, wheels, braking systems, steering systems, or a combination thereof from each other. Each section may include one or more corresponding compartment. Each compartment may be sealed or unsealed. The compartments may be watertight. The frame 12 may include two or more, three or more, four or more, eight or more, or even ten or more compartments. In some examples, as shown in FIGS. 3-6, the OTV 10 is divided into at least two sections 14, 16 which are a control section 14 having a first thickness and profile, and a carrier section 16 (also known as a target section) having a shorter, sleeker thickness and profile. The control section and the target section may be connected by a transition section 58, which transitions from the height of one section to the other. The control section 14 of the OTV may house a portion of the control system 80 and drive systems 23 of the OTV 10. The carrier section 16 may house the soft target mounting area 96 for connecting the soft target mount 94 to the OTV 10. The soft target mounting area 96 may be a plurality of mounting holes disposed throughout the carrier section 16 of the OTV as shown in FIG. 5B. Example mounting positions for the soft target mount 94 can be seen in FIG. 5C. Once a soft target 92 is attached with the soft target mount, anchors 93 may be used to further secure the soft target to the carrier section 16. The anchors 93 may be magnetic. As can be seen in FIGS. 5A to 6, the OTV 10 includes a transition section 58 of the frame 12 which connects the control section 14 to the carrier section 16.

Figure 9:
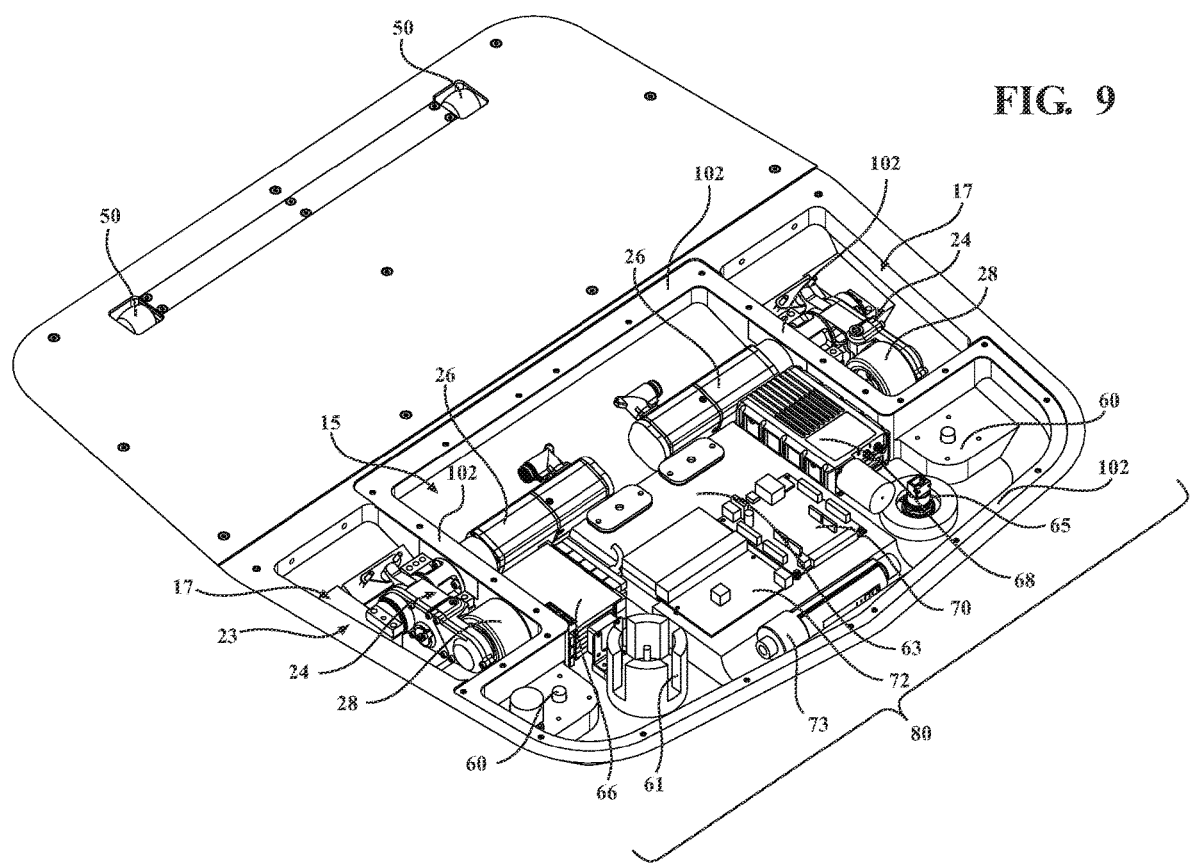
FIG. 9 illustrates a perspective view of the bottom of a test vehicle without a cover.
Figure 10A:
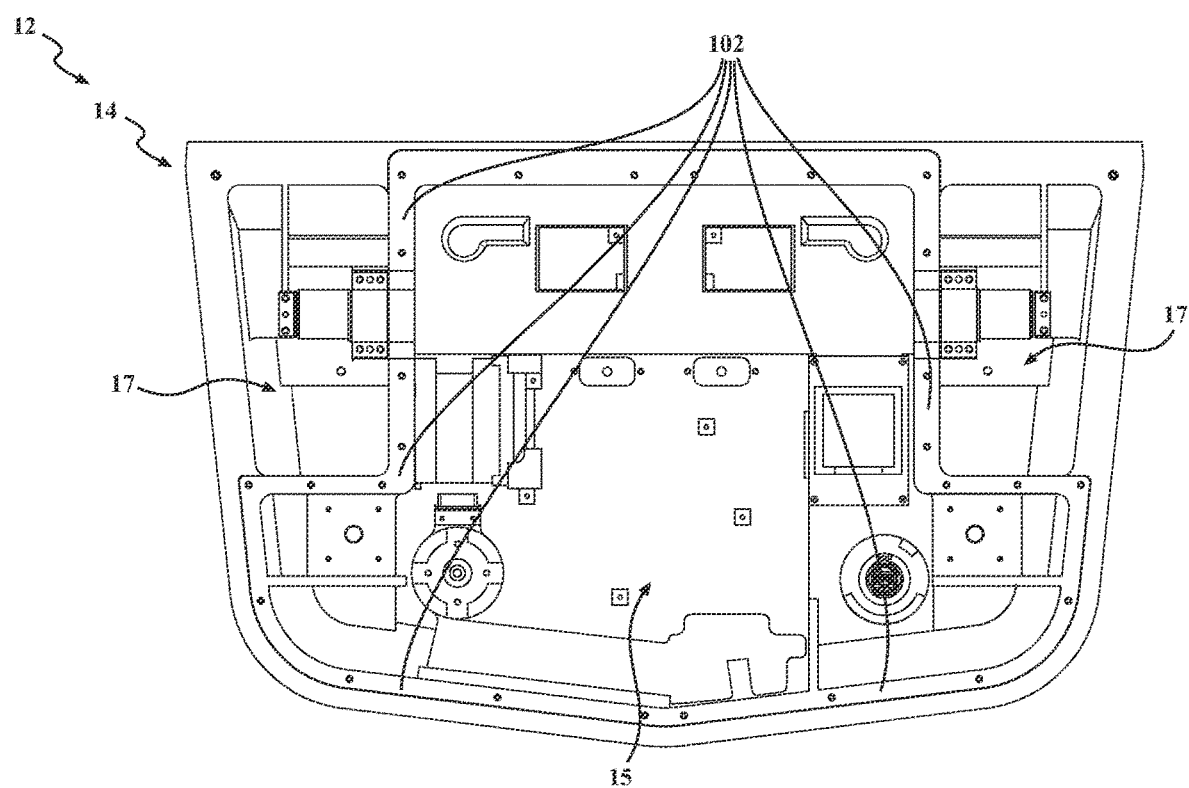
FIG. 10A is a bottom view of a control section shell.
Figure 10B:
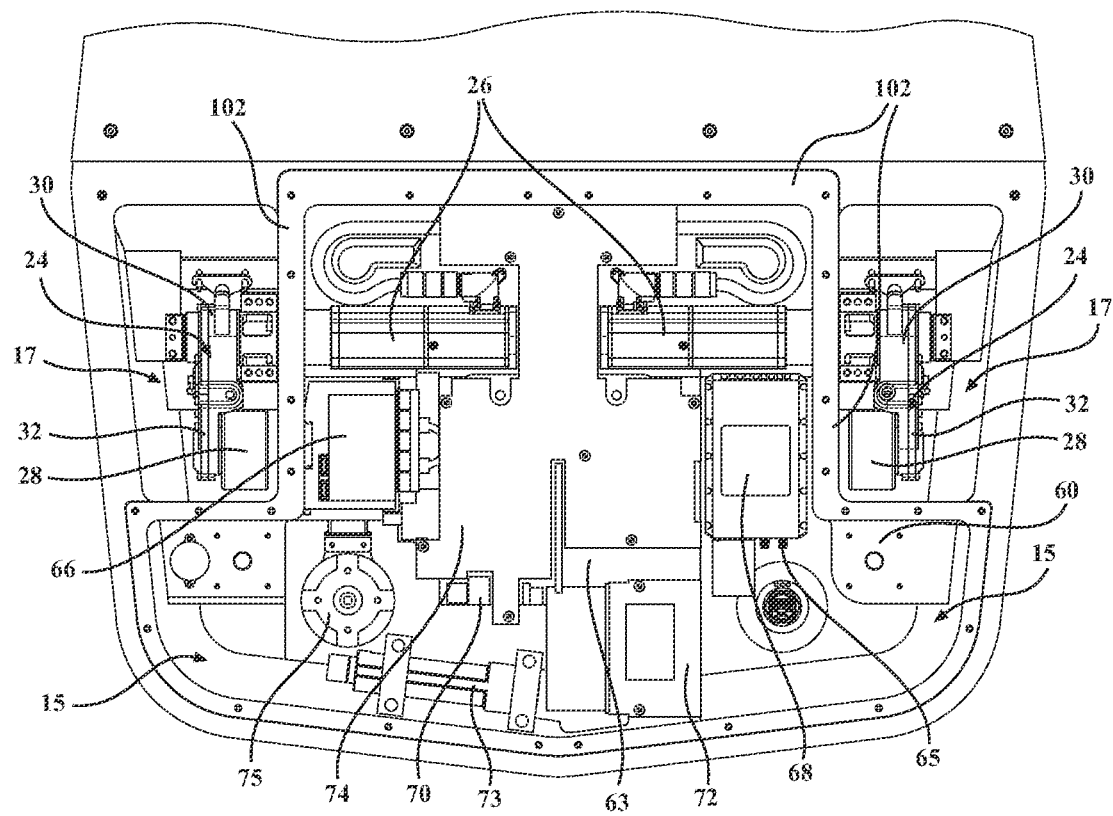
FIG. 10B illustrates a bottom view of one example of a control section of the test vehicle.

The OTV 10 may include one or more covers for each section and/or compartment of the OTV. The one or more covers 100 may function to protect the contents of the section 14, 16, 58 in which are concealed by the cover 100 and the frame 12. For example, a bottom cover 100 may protect at least a portion of the control system 80 of the test vehicle 10 from the bottom, while the chassis 12 of the OTV 10 protects the top portion. The cover 100 may function to protect the contents of the OTV 10 from a vehicle 90 riding over the test vehicle 10. The cover 100 may be a single piece or multiple pieces covering a specific area. The cover 100 may be removably attached to the frame 12. The cover 100 may include one or more vents, one or more handles, one or more locks, or a combination thereof. The cover 100 may be made of steel, composite material, plastic, or a combination thereof. The cover 100 may be made of the same material as the frame 12, the sidewalls 18, 20, 22, or both. The cover 100 may be made of a different material as the frame 12, the sidewalls 18, 20 22, or both. The cover 100 may be located on at least one plane as at least one edge of the plurality of sidewalls 18, 20, 22 (e.g. the cover 100 and the bottom edge of the sidewall 18). The cover 100 may cover portions of the frame 12 which are hollow and house at least a portion of the control system 80, propulsion systems/drivetrain 23, sensors, or a combination thereof. For example, FIGS. 9 and 10 show the bottom of the OTV 10 without cover 100. Cover 100 is connected to the frame 12 with a series of fasteners along the seal 102. The seal 102 keeps the components within the frame 12 from being affected by road debris, fluid, or any other potential hazardous material which a test vehicle 10 may encounter during normal operation.

Figure 7:
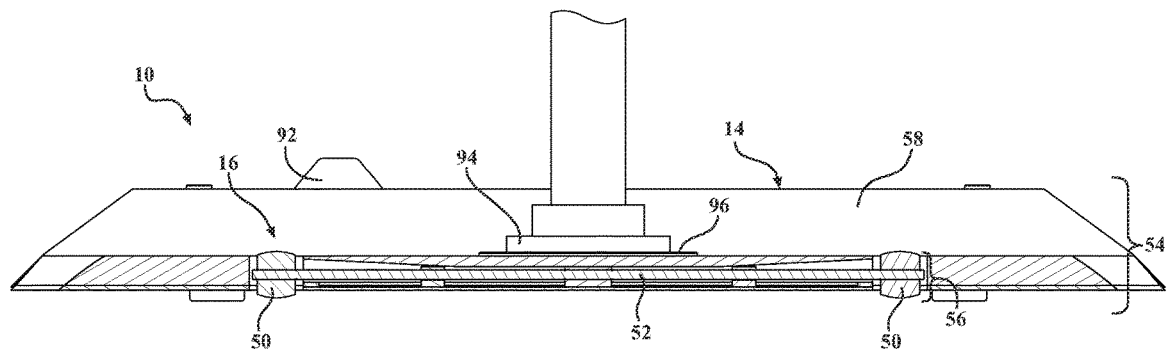
FIG. 7 is a partial cross-sectional view of a test vehicle.

The carrier section 16 of the OTV 10 is configured to hold the soft target mount pad 96 for connecting the soft target mount 94. The carrier section 16 is exceptionally thin to provide a minimal radar cross section (RCS). A minimal RCS may function to allow a vehicle 90 with ADAS being tested to identify the soft target 92 without necessarily picking up the RCS of the OTV 10, reducing radar interference of the ADASs of the vehicle 90 from the OTV 10. The carrier section has a thickness 56, as shown in FIGS. 5-7. The thickness 56 may be between 5 mm and 35 mm. In some examples, the carrier section 16 may be about 25 mm or less.

Figure 12A:
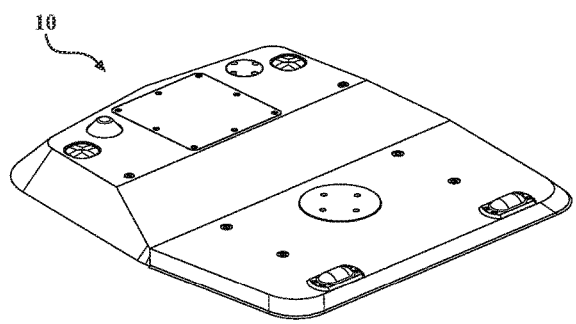
FIGS. 12A-12C are perspective views of various examples of a test vehicle.
Figure 12B:
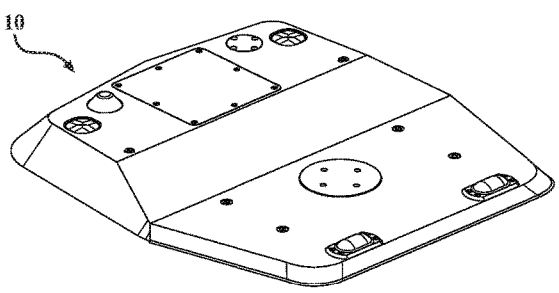

As can be seen best in FIG. 7, the carrier section 56 profile cross section thickness 56 is substantially thinner than the control section 14 profile thickness 54. The control section 14 may have a thickness of about 25 mm to 200 mm. In some examples, the control section 14 has a thickness 54 of about 75 mm or less. The OTV 10 is configured to minimize the radar cross section (RCS) such that the profile of the OTV 10 will not disrupt the radar signature of the soft target carried by the OTV 10. The OTV 10 may have any shape which reduces the radar cross section of the carrier. In some examples, the OTV 10 may have a relatively diamond shape. In other examples, such as in FIGS. 12A, 12B and 12C, the OTV 10 may be square, rhombic, circular, pentagonal, hexagonal, polygonal, or any shape which may reduce radar cross section. The shape, height, slope, and material selection all contribute to the RCS.

Figure 12C:
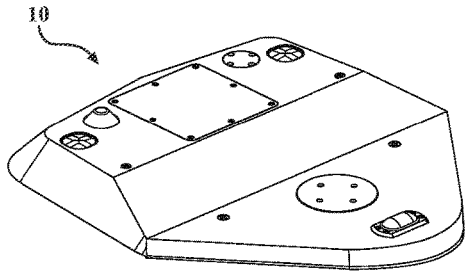
Figure 14:
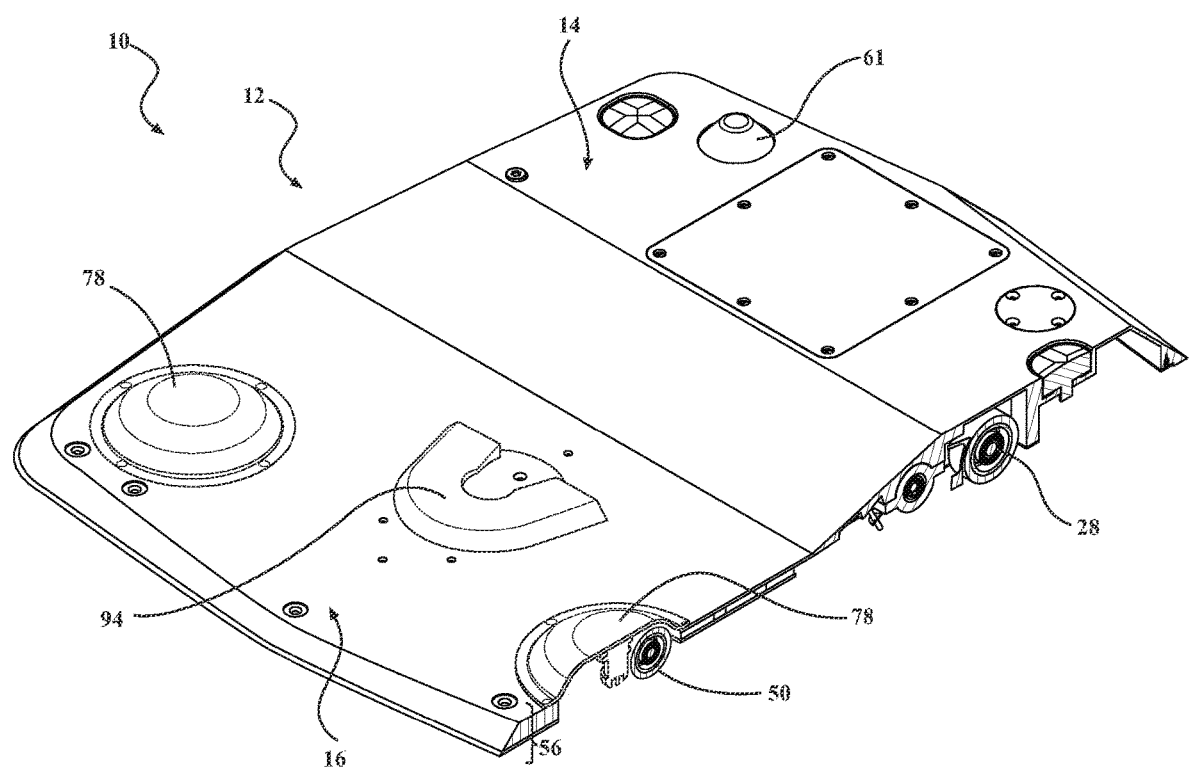
FIG. 14 is a perspective view of an example of a test vehicle.

FIG. 7 is a cross sectional view of the carrier section 16. The carrier section 16 includes one or more casters 50. As seen in FIG. 7, the OTV 10 includes two casters 50 connected by a caster axle 52. In another example, FIG. 12C shows an OTV 10 with one caster. The caster axle 52 is disposed within the carrier section 16. The carrier section 16 provides for openings which allow the casters 50 to protrude through and contact a surface. The casters 50 are slightly taller than the profile 56 of the carrier section 16 so that the OTV 10 can be moved without the carrier section 16 contacting the ground. Further, in some examples, such as shown in FIG. 14, the casters 50 may be swivel casters, allowing the casters 50 and corresponding caster axles to rotate about an axis. As can be seen in FIGS. 5B and 14 the casters may have a top cover 78 removably secured to the frame 12 on the outer surface 99.

Turning to FIGS. 5A and 6, the frame 12 may include a plurality of side walls 18, 20, 22. The sidewalls 18, 20, 22 may be sloped to allow for ingress or egress of a vehicle while performing a test. The sidewalls 18, 20, 22 may have different or varying slopes around the perimeter of the OTV 10. The sidewalls 18, 20, 22 may have the same slope. The sidewalls 18, 20, 22 may have a height which corresponds with the section of the frame 12 the sidewalls 18, 20, 22 are connect with. In some examples, each of the sidewalls 18, 20, 22 may be configured as ramps. The plurality of sidewalls 18, 20, 22 may function to assist a vehicle 90 with Advanced Driver Assistant Systems (ADAS) technology run over the test vehicle 10 by allowing the tires of vehicle 90 to climb over the test vehicle 10. Each of the sidewalls 18, 20, 22 may be one or more, two or more, four or more, six or more, or even 10 or more sidewalls. In some examples, one or more of the sidewalls 18, 20, 22 may be permanently connected with the frame 12, one or more covers 99, 100, or both. In other examples, the sidewalls 18, 20, 22 may be removably connected with the frame 12, the one or more covers 99, 100, or both. The plurality of sidewalls 18, 20, 22 may extend from the bottom plane of the OTV 10 to the top plane of the OTV 10, sloping upwards creating a ramp. A top portion of the plurality of sidewalls 18, 20, 22 may be flush and planar with the top portion of one or more of the OTV sections 14, 16, 58. A bottom portion of the plurality of sidewalls 18, 20, 22 may be flush and planar with the bottom portion of one or more of the OTV sections 14, 16, 58. The OTV 10 may include at least one sidewall 18, 20, 22 for each side or portion of the test vehicle 10 so that the test vehicle may be easily overrun on any side.

The control section sidewalls 18 include corners 19 which are rounded and sloped to minimize radar cross section while allowing a vehicle to overrun the test vehicle during operation. The sidewalls 18 and corners 19 may be nonplanar, such as having an arched profile. The corners 19 may assist in transitioning the profile of the front of the OTV 10 with the profile of the side of the OTV 10 to maintain the desired radar cross section. The corners 19 may have a different height, slope, profile, or combination thereof. At the distal end of the control section 14, the sidewalls 18 may meet at a protrusion 76 which may have different characteristics than the sidewalls 18, such as a different height, slope, profile, or a combination thereof. Similarly, protrusions 76 may be located along any of the sidewalls 18, 20, 22 of the OTV 10, as shown in FIG. 5B. The protrusion 76 may assist in achieving the desired radar cross section of the OTV 10. Each protrusion 76 may be located along a sidewall 18, 20, 22. As shown in FIGS. 5A and 5B, each protrusion 76 is located approximately in the middle of each sidewall 18, 20, 22. For example, the protrusion 76 along the control section 14 is located medially between corners 19 with the walls 18 extending from the protrusion 76 to the corners 19 to give the control section 14 one example of a desirable shape and radar cross section. The sidewalls 18, 20, 22 along with corners 19, 21 and protrusion 76 contribute to the profile of the OTV 10 that is partially angular and partially rounded and/or arched, reducing the radar cross section so that during testing, a vehicle with ADAS registers the radar cross section of the soft target 92 riding on the OTV 10 while minimizing the radar cross section of the OTV 10.

Similar to the control section, the carrier section sidewalls 20 includes corners 21 with a shorter and thinner profile matching the sidewalls 20. On the distal end of the carrier section 16, sidewall 20 extends between corners 21. The sidewalls 20 and the corners 21 have a slope and a height which minimize the radar cross section of the carrier section 16 while allowing the OTV 10 to be overrun during a test. Similar to the control section 14, the carrier section 16 may also include a protrusion 76. As seen in FIG. 5B, the protrusion 76 along the carrier section 16 is located medially between corners 21 along the sidewalls 20 extending from the protrusion 76 to the corners 21 to give the carrier section 16 one example of a desirable shape and radar cross section. The carrier section walls 20 along with corners 21 and protrusion 76 contribute to the profile of the OTV 10 that is partially angular and partially rounded and/or arched, reducing the radar cross section so that during testing, a vehicle with ADAS registers the radar cross section of the soft target 92 riding on the OTV 10 while minimizing the radar cross section of the OTV 10.

As can be seen in FIG. 5A, a first set of sidewalls 18 associated with the control section 14 of the OTV 10 has a first height 54 and a second set of sidewalls 20 associated with the carrier section 16 of the frame 12 has a second height 56. In some examples, the first sidewalls 18 and the second sidewalls 20 have the same slope despite the difference in height. In other examples, the first sidewalls 18 and the second sidewalls 20 have different slopes. In some examples, the sidewalls 18 and 20 may be rounded and/or arched. A transition sidewall 22 along the transition section 58 having a varying profile is used to transition between the height difference between the control section 14 and the carrier section 16. The transition sidewall 22 may have the same pitched slope as the first sidewall 18, the second sidewall 20, a varying slope between the first and second sidewalls, or a combination thereof. In some examples, the transition sidewall 22 may be rounded and/or arched. In some examples, the sidewalls 18, 20, 22 may be removably connected with the frame 12. Similar to the control section 14 and the carrier section 16, the transition section 58 and corresponding sidewalls 22 contribute to the profile of the OTV 10 that is partially angular and partially rounded, reducing the radar cross section so that during testing, a vehicle with ADAS registers the radar cross section of the soft target 92 riding on the OTV 10 while minimizing the radar cross section of the OTV 10.

The control section 14 of the OTV 10 may be configured to carry the control system 80 and the drivetrain 23 of the OTV 10. The control section 14 may be coupled to a control system 80, one or more propulsion systems (e.g. one or more drive trains 23), one or more batteries 82, a plurality of sensors, a plurality of antennas, or a combination thereof. The control section 14 may be taller than the target section 16. In some cases, the control section may have a height that is at least 50% larger, 80% larger, 100% larger, 300% larger, or even 500% larger. In one example, as seen in FIG. 6, the control section 14 is shown with a height 54 approximately triple (300% larger) the height 56 of the carrier section 16.

The OTV 10 includes one or more motors 24 located within the control section 14. The one or more motors 24 may function to provide propulsion to the OTV 10. The one or more motors may function to assist in slowing down or stopping the OTV 10. The one or more motors 26 may be electric motors. The OTV 10 may include one or more, two or more, three or more, four or more, or even a plurality of motors 26. As seen in FIGS. 9 and 10, the OTV 10 includes two motors 26. Each motor 26 may include a motor housing and an output shaft. Each of the one or more motors 26 may be independently powered and controlled. The one or more motors 26 may be controlled separately by the control system 80. In other examples, each motor 26 includes an integrated motor controller. The integrated motor controller may function to determine and communicate the one or more motor parameters between the motor 26 and the control system 80. The one or more motors 26 may function as a steering system. For example, as shown in FIGS. 9 and 10, the motors 26 may be operatively connected with the transaxle 24 and control the steering of the OTV 10 by increasing and decreasing power output and direction of rotation of the wheels 28 through each transaxle 24. The placement of the transaxles 24 allow the OTV 10 to turn on the spot with a turning radius of 300 mm or less. The one or more motors 24 may be a part of the drivetrain 23 and connected with the transaxle, the suspension system 39, one or more power supplies 82, one or more wheels 18, or a combination thereof.

The one or more motors 26 power the drivetrain 23. The drivetrain 23 may include a transaxle 24. The transaxle 24 may function to translate rotational movement from the output of each motor 26 into rotational movement of one or more wheels 38 at a location away from the output shaft of the motors 26. In some examples, the transaxle may be a chain drive connecting the output of the motors 26 to a drive wheel 38. The chain drive may function to transfer rotational movement from an output shaft of the motor 26 to power a wheel 38. Each motor 26 may include one or more, two or more, three or more, or even a plurality of chain drives. Each chain drive may include a first sprocket 30 on the output shaft of the motor 26 and a second sprocket 32 on a drive axle of the drive wheel 38. Each chain drive may include at least one means of transmission between the first sprocket 30 and the second sprocket 32. The chain drive may include at least one chain, belt, band, the like, or a combination thereof. Connected with the chain drive may be a tensioner 36. The tensioner 36 may be used to control the engagement and disengagement of the drive wheel 38 by controlling the tension and slack applied to the chain drive.

The drivetrain 23 may be configured to accelerate and decelerate the OTV 10. As noted above, the OTV may be capable of speeds of at least 5 kph, at least 10 kph, or even at least 20 kph. The speed at which the OTV 10 may travel is dependent on the load carried by the OTV 10, which, in most cases, will be a soft target 92. The drivetrain 23 may be configured to accelerate the OTV 10 at a rate 0.1 m/s$^2$ and 5.0 m/s$^2$ or more. The drivetrain 23 may be configured to assist the OTV 10 in decelerating and stopping at a rate ranging between −0.1 m/s$^2$ and −5.0 m/s$^2$ or more. In some examples, the rate of acceleration and deceleration is weight dependent. In one example, the OTV 10 is capable of accelerating at a rate of 2.0 m/s$^2$ and decelerate at a rate of −2.0 m/s$^2$ with a payload of 10 kg. In other examples, the OTV 10 is capable of accelerating at a rate of 1.6 m/s$^2$ and decelerating at a rate of −1.6 m/s$^2$ with a payload of 20 kg. Acceleration and deceleration are affected by the weight of the payload on the OTV 10 resulting in slower acceleration and deceleration when the weight of the soft target 92 is increased.

The transaxle 24 is integrated with and is a part of the suspension system 39. The suspension system 39 may function to allow relative movement between the frame 12 and the discrepancies of the road as contacted by the wheels 38, provide damping as the OTV 10 maneuvers over a surface. The suspension system 39 comprises the drivetrain 23 and one or more dampers 40, with at least a portion of the drivetrain 23 and the damper 40 each interacting with the frame 12 of the OTV 10, directly or indirectly. The suspension system 39 and transaxle 24 can be seen in FIGS. 11A-11D. The suspension system 39 may function to absorb some of the shock of being run over during a test, minimizing damage sustained to the OTV 10. The suspension system 39 may include one or more absorbers and/or dampers 40. The one or more absorbers 40 may be shocks, struts, springs, or any other suitable damping device. The one or more suspension system 39 may be operatively connected with one or more wheels 38, one or more motors 26, the frame 12, or a combination thereof. For example, a first damper 40 is connected with a first transaxle 24, and a second damper 40 is connected with a second transaxle 24 so that when the OTV 10 rides over a change in the driving surface, the drive wheels 38 remain planted on the driving surface. In some examples, the suspension system 39 is configured to be movable into the frame 12 when the OTV 10 is ran over, allowing the outer surface 99 and the frame 12 to take the impact of being driven over, such that the bottom surface of the frame 12 contacts the ground to take the load of the overrun.

The OTV 10 includes at least one drive wheel 38 per transaxle 24. The drive wheels 38 may function to move the OTV 10 over a surface. The frame 12 may include two or more, three or more, or even four or more drive wheels 38. For example, as seen in FIGS. 6 and 8-10, the frame 12 houses two drive wheels 38, one on each transaxle 24. Preferably, each drive wheel 38 is cylindrical. Each of the drive wheels 38 may include a tire wrapped around its circumference. The tires may function to provide traction on a surface. The tires may be made natural rubber, synthetic rubber, plastic, fabric, steel, polymers, or a combination thereof. The tires may be inflatable. The tires may be an airless design. The tires may be solid. The tires may be deformable. The tires may be a disposable item that may be replaced when worn out.

Figure 11A:
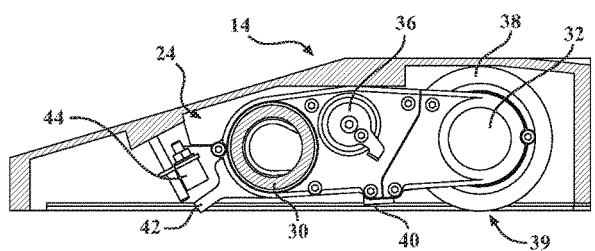
FIGS. 11A-11D illustrates a drive train and suspension system at different positions.
Figure 11B:
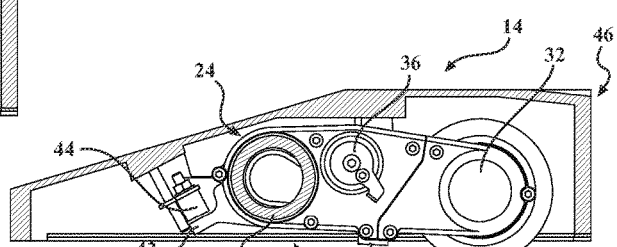
Figure 11C:
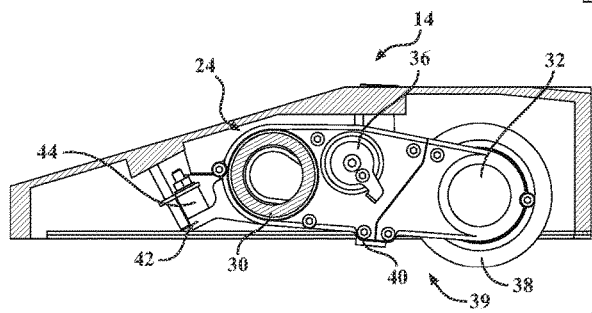
Figure 11D:
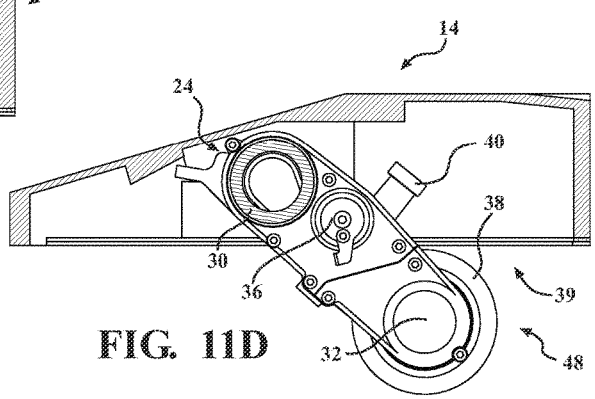

In order to service the drivetrain 23 of the OTV 10, the transaxles 24 may be moved from an operating position 46 to a service position 48. The operating position 46 is the position which the transaxle 24 is in when operating. As can be seen in FIGS. 11A-11C, the operating position 46 is the range of motion the transaxle 24 may travel during operation. To maintain the operating position 46, an adjustable stop 44 interacts with an extension 42 projecting from the transaxle 24. The adjustable stop 44 can be set to limit the amount of travel the transaxle 24 and suspension system 39 may travel. The adjustable stops 44 may be configured to set a nominal ground clearance of the chassis 12. The stop 44 contacts the extension 42 when the transaxle 24 reaches a maximum amount of travel. The maximum amount of travel is adjustable. The service position 48 is seen in FIG. 11D. To place the OTV 10 into the service position, the adjustable stop 44 may be removed or adjusted to allow the transaxle 24 to be brought out of the frame 12 so that service may be performed on the wheel 38, transaxle 24, chain/belt, sprocket, output shaft of the motor 26, or a combination thereof.

Figure 8:
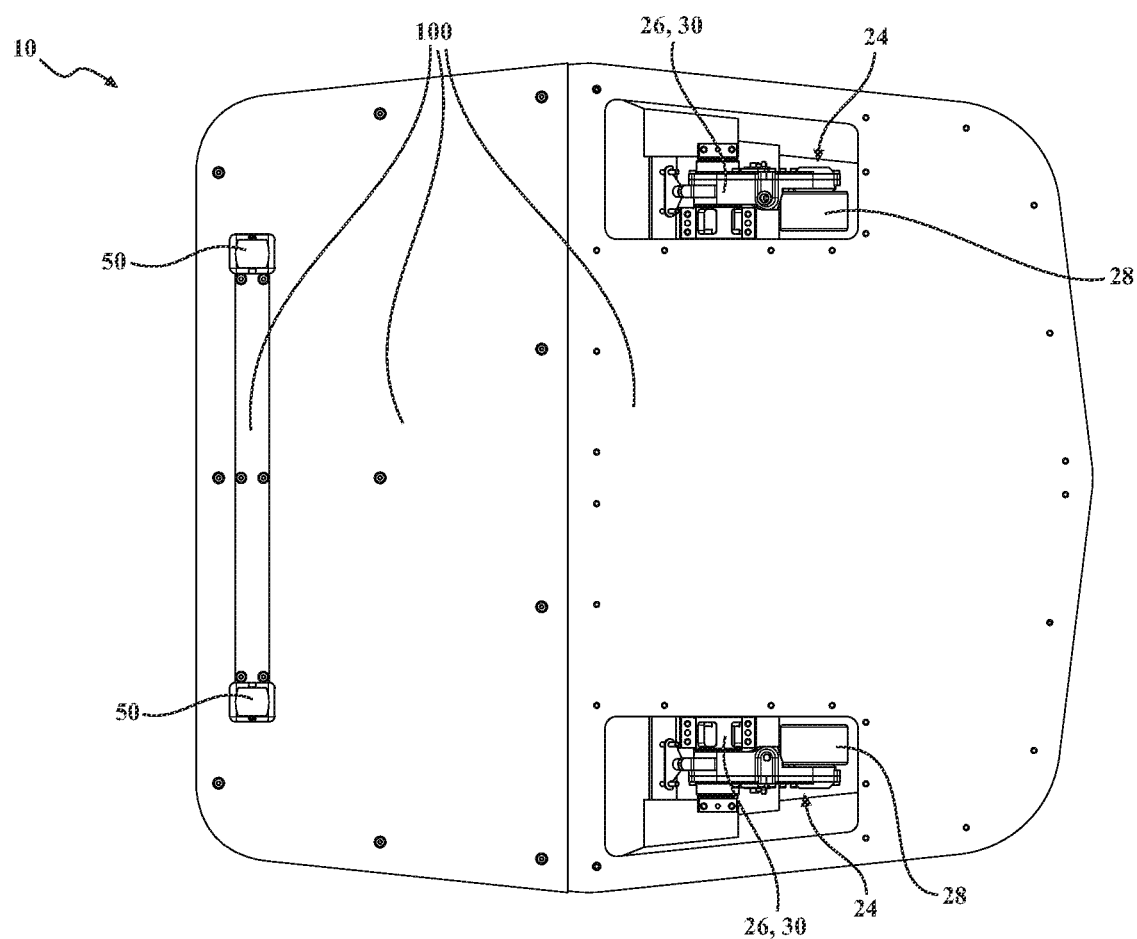
FIG. 8 illustrates a bottom view of a test vehicle.

As mentioned above, the control section 14 houses at least a portion of the control system 80, one or more drive trains 23, one or more batteries 82, a plurality of sensors, a plurality of antennas, or a combination thereof within the control section cavity 15. The cavity 15 of the control section 14 is a hollowed space where a portion of the control system 80, drive trains 23, batteries 82, one or more of the plurality of sensors, one or more of the plurality of antennas, or a combination thereof are mounted and/or stored. The cavity 15 may be divided into compartments (as mentioned above). For example, as seen in FIGS. 9 and 10, the cavity 15 is divided into a sealed portion, where the cover 100 is removably connected with the sealing portion 102, and an exposed portion—drive compartments 17, where the transaxles 24 are exposed to the atmosphere. For example, FIG. 8 shows the cover 100 concealing the cavity 15 while drive compartment 17 is uncovered allowing the transaxles 24 to contact the ground. The output of the motors 26 pass through the sealed portion into the exposed portion to power the transaxles 24.

The OTV 10 includes one or more batteries 82. The one or more batteries 82 may function to provide power to test vehicle 10. The test vehicle 10 may have one or more, two or more, three or more, four or more, or even a plurality of batteries 82. The one or more batteries 82 may be removably connected with the test vehicle 10. The one or more batteries are connected with a power controller. In some examples, the one or more batteries are integrated with the power controller. In some examples, there is one power controller for each battery. In other examples, the power controller and the one or more batteries are separate. The one or more batteries may provide the OTV 10 with one or more hours, two or more hours, three or more hours, or even four or more hours of operation. In some examples, the one or more batteries may provide two hours of use, performing 20 or more tests while the OTV 10 is fully loaded. The one or more batteries 82 may power the motors 26 to move the OTV 10 to 12 or more kph. The one or more batteries may power the motors 26 to provide constant speed for an extended period of time while testing. The one or more batteries 82 may swappable so that a user may quickly change to a charged battery to resume testing. The one or more batteries 82 may charge in two or less hours, one or less hours, or even half an hour or less. The one or more batteries may be located in one or more compartments of the OTV 10. The one or more batteries 82 may be flush with the top plane of the cover 20 of the test vehicle 10 when installed in the test vehicle. In some examples, as seen in FIG. 5, the battery is stored within the frame 12 and a battery cover 62 is disposed on the top surface of the OTV 10, concealing and sealing the one or more batteries 82. The battery cover 62 may be configured to "hot swap" the one or more batteries 82, meaning that the cover is configured to be unattached quickly so that the one or more batteries 82 that have been exhausted can be changed for a charged battery. The battery cover 62 may include a plurality of magnets and integrated quick-disconnect screws for connecting to the chassis 12. In FIGS. 9 and 10, the one or more batteries 82 are located under controllers 70 and 72 in the battery housing 63.

The OTV includes a control system 80 which may include a plurality of controllers, a plurality of sensors, or both working in unison and/or independently. In some examples, the control system may include one or more on-board controllers, and one or more remote controllers. In some examples, the one or more on-board controllers may work in conjunction with one or more remote controllers. A remote controller may be used to control one or more OTVs 10. As can best be seen in FIGS. 9 and 10, the control system 80 may include a control board 74, a safety controller 66, inertial measurement unit 68, steering controller 70, communications controller 72, an onboard WiFi module 73, GPS antennas 60,75, maintenance port 65, motors 26, or a combination thereof. The control system 80 may also include a plurality of sensors such as a ground speed sensor, an inertial sensor, a force sensor, the like, or a combination thereof.

The safety controller may be used to determine and maintain an appropriate performance level according by calculating an analysis of failure modes and effects, ensuring that the OTV operates as intended. For example, the safety controller 66 prevents unintentional movement and determine appropriate conditions for the OTV 10 to emergency stop.

The inertial measurement unit 68 may function to monitor the speed and acceleration of the OTV 10 using GPS, ground speed sensors, and inertial sensors, providing the data to the safety controller, the steering controller, the communications controller, or any part of the control system 80 necessary to control the OTV 10. The inertial measurement unit is connected with the GPS antennas 60, 75 as shown in FIGS. 8 and 9.

The GPS antennas 60, 75 may be used to localize the OTV 10 and track the position of the OTV 10 during a test. In some examples, other forms of localizing the position of the OTV 10 may be used, such as ultraband receivers and beacons.

The maintenance port 65 may be used to connect external equipment to the OTV 10 to gather data, adjust settings, or perform routine maintenance. The maintenance port 65 may be powered and may additionally function to provide a power source to an articulated soft target 92. For example, a soft target 92 may be configured as a person with moving legs and may be connected through a cable to the maintenance port 65 to provide power to the soft target 92, enabling the legs to articulate on the soft target 92.

The steering controller may function to control the steering of the OTV 10 through an algorithm based on speed, acceleration, power levels, location, and other attributes of the OTV 10 during operation. The communications controller may function to link the control system and any other external controllers together, serving as an on-board local area network. The communications controller is connected with the WiFi module 73 and WiFi antenna 61. In some examples, the WiFi antenna 61 may extend out of the frame 12 past the outer surface 99 to provide better connectivity and is configured to withstand being overrun. The WiFi antenna may be removably connected. The WiFi antenna 61 may be a disposable part.

The control system 80 is connected with the one or more motors 26, the one or more motor controllers, one or more remote controllers, or a combination thereof. The control system 80 may include the one or more motors, one or more motor controllers, or both. The control system 80 may send messages and/or commands relating to one or more motor parameters to the motor controller which controls the actuation of the motor 26. Motor parameters are one or more outputs of the motor which can be commanded by the motor controller, the control system 80, or both. The motor parameters may include a motor speed, a motor torque, or both. The one or more motor parameters may be executed by delivering a specific electric current to the one or more motors 26. The motor controller may communicate with the control system 80 through a controller area network (CAN) which sends data through the control system 80, controlling the operation of the OTV 10. For example, when a deceleration is commanded by the control system 80, the one or more motors 26 may receive a CAN command to slow the OTV 10 down to a desired rate by adjusting the motor speed, motor torque, or both. The control system 80 may function to control the amount of braking force used by the OTV 10 to decelerate and stop. The control system 80 may work in conjunction with the motor controller to control the one or more motor parameters to slow down or stop the OTV 10 at a particular deceleration.

The control system 80 may receive data from the plurality of sensors and controllers (e.g. ground speed sensor, GPS antenna 60, 75, motor 26, external controllers). For example, the ground speed sensor may function to calculate the speed of the frame 12. The ground speed sensor may be connected with the control system 80 and send the speed measurements, inertial measurements, or both to the controller 80 for processing. The ground speed sensor may be located on or in one or more of the plurality of controllers 66, 68, 70, 72 within the control system 80. The ground speed sensor may work in conjunction with or be a part of the GPS antenna 60, 75 to ascertain the ground speed of the frame 12. The control system 80 may calculate the optimum acceleration parameters, deceleration parameters, or both based on the data received from the plurality of sensors. The control system 80 may utilize an algorithm which optimizes acceleration and deceleration without causing unnecessary or undesirable conditions such as a wheel slip condition. The control system 80 is configured to control the operations of the OTV 10 during a dynamic vehicle test.

Figure 13:
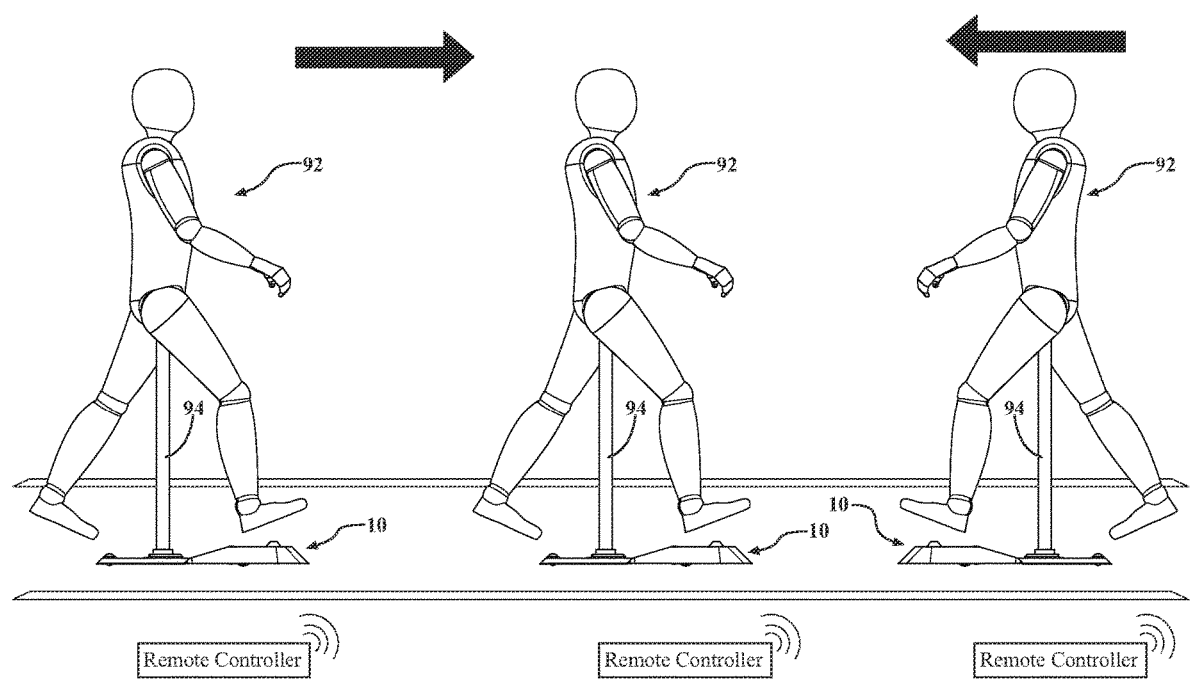
FIG. 13 illustrates a plurality of OTVs representing a pedestrian crosswalk simulation.

The OTV 10 is configured to be used in dynamic vehicle tests for testing Advanced Driver Assistant Systems (ADAS) in automobiles. In order to simulate real-world experiences, a one or more OTVs 10 are used with a soft target 92. In some examples, there may be a plurality of OTVs 10. The plurality of OTVs 10 may be arranged to simulate an urban environment, such as a pedestrian cross walk, such as shown in FIG. 13. In this example, one or more of the plurality of OTVs 10 may be carrying soft targets 92 configured as pedestrians, bicyclists, animals, or a combination thereof.

The small footprint of the OTVs 10 allows the plurality of OTVs 10 to be arranged and driven to represent the busy pedestrian intersection. In one example, one or more remote controllers may be used to communicate with each of the plurality of OTVs 10. In some examples, an individual remote control may be used to control a single OTV 10. In other examples, one remote control may be used to control two or more of the plurality of OTVs 10.

In some examples, the plurality of OTVs 10 representing a busy pedestrian intersection may be configured to move in the same direction during the test. In other examples, the plurality of OTVs may be configured to move in different directions. In one example, at least one of the plurality of OTVs 10 is a first OTV and is configured to move in a first direction, and at least a second of the plurality of OTVs 10 is a second OTV 10 and is configured to move in a second direction, such as in an opposed direction to the first OTV 10.

The invention claimed is:

1. An overrunable test vehicle for dynamic vehicle testing of advanced driver assistant systems, the overrunable test vehicle comprising:
    a chassis comprising:
        a control section defining a cavity, the control section having a first profile height; and
        a carrier section having a second profile height less than the control first profile height of the control section, the carrier section including a mounting area configured to receive a soft target;
    one or more unpowered casters supported by the chassis in the carrier section;
    exactly two drive mechanisms at least partially disposed within the cavity of the control section, with each drive mechanism having an electric motor and a drive wheel coupled to the electric motor; and
    a control system at least partially disposed within the cavity of the control section and in communication with the each electric motor, wherein the control system is configured to operate the electric motors independently to control the steering of the overrunable test vehicle by adjusting at least one of power output and direction of rotation of the electric motors.

2. The overrunable test vehicle of claim 1, wherein first profile height of the control section is at least 50 percent greater than the second profile height of the carrier section.

3. The overrunable test vehicle of claim 1, wherein the carrier section and the control section each include a ramped side wall, the ramped sidewall of the carrier section having a different slope than the ramped sidewall of the control section.

4. The overrunable test vehicle of claim 1, wherein the carrier section and the control section each include a ramped side wall, the ramped sidewall of the carrier section having a same slope as the ramped sidewall of the control section.

5. The overrunable test vehicle of claim 1, wherein the carrier section and the control section each include a ramped side wall, the ramped sidewalls having a slope configured to assist a vehicle to overrun the test vehicle during operation.

6. The overrunable test vehicle of claim 5, wherein the height and profile of the control section and the height and profile of the carrier section minimize a radar cross section of the chassis.

7. The overrunable test vehicle of claim 1, wherein the chassis is a unitary structure.

8. The overrunable test vehicle of claim 1, wherein the control section and the carrier section are modular components connected together to form the chassis.

9. The overrunable test vehicle of claim 1, wherein the carrier section includes a planar surface, the mounting area is located on the planar surface.

10. The overrunable test vehicle of claim 9, wherein the mounting area is moveably positionable about the planar surface of the carrier section.

11. The overrunable test vehicle of claim 1, wherein the first profile height of the control section is between 25 mm and 200 mm.

12. The overrunable test vehicle of claim 11, wherein the first profile height of the control section is 75 mm or less.

13. The overrunable test vehicle of claim 1, wherein the second profile height of the control section is between 5 mm and 35 mm.

14. The overrunable test vehicle of claim 13, wherein the second profile height of the carrier section is 25 mm or less.

15. The overrunable test vehicle of claim 1, wherein the first profile height of the control section and the second profile height of the carrier section have a ratio of 3:1 ratio.

16. The overrunable test vehicle of claim 1, wherein the one or more casters are further defined as swivel casters.

17. The overrunable test vehicle of claim 1, wherein the one or more casters includes two casters connected by a caster axle disposed within the carrier section.

18. The overrunable test vehicle of claim 1, wherein the drive mechanisms each further comprise a transaxle arranged between the electric motor and the drive wheel for translating rotational movement from the electric motor into rotational movement of the drive wheel.

19. The overrunable test vehicle of claim 18, wherein the drive mechanisms each further comprise a suspension system including a damper coupled to the chassis and the transaxle between the chassis and the drive wheel.

* * * * *

UNITED STATES PATENT AND TRADEMARK OFFICE
CERTIFICATE OF CORRECTION

| | | |
|---|---|---|
| PATENT NO. | : 12,122,363 B2 | Page 1 of 1 |
| APPLICATION NO. | : 17/549383 | |
| DATED | : October 22, 2024 | |
| INVENTOR(S) | : David Wirthl et al. | |

It is certified that error appears in the above-identified patent and that said Letters Patent is hereby corrected as shown below:

In the Claims

Column 12, Line 27 (Claim 1): delete "the control first profile height" and insert therefor -- the first profile height --.

Column 12, Line 38 (Claim 1): delete "the each electric motor" and insert therefor -- each electric motor --.

Signed and Sealed this
Twenty-fourth Day of June, 2025

Coke Morgan Stewart
*Acting Director of the United States Patent and Trademark Office*